(12) United States Patent
Mine et al.

(10) Patent No.: US 11,167,306 B2
(45) Date of Patent: Nov. 9, 2021

(54) APPLICATION SYSTEM, OPERATION SYSTEM, AND POSTURE CHANGING UNIT

(71) Applicant: HIRATA CORPORATION, Kumamoto (JP)

(72) Inventors: Koshi Mine, Kumamoto (JP); Koichi Hokimoto, Kumamoto (JP); Yasuaki Kuroki, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 16/788,846

(22) Filed: Feb. 12, 2020

(65) Prior Publication Data

US 2020/0179972 A1    Jun. 11, 2020

Related U.S. Application Data

(63) Continuation of application No. PCT/JP2018/045842, filed on Dec. 13, 2018.

(30) Foreign Application Priority Data

Jan. 16, 2018    (JP) .............................. JP2018-005055

(51) Int. Cl.
    *B05B 13/04*    (2006.01)
    *B05C 5/02*    (2006.01)
    *B05C 13/02*    (2006.01)

(52) U.S. Cl.
    CPC ............ *B05B 13/0457* (2013.01); *B05C 5/02* (2013.01); *B05C 13/02* (2013.01)

(58) Field of Classification Search
    USPC ......................................... 118/305, 323, 500
    See application file for complete search history.

(56) References Cited

U.S. PATENT DOCUMENTS

| 5,520,951 A | 5/1996 | Yasuhara |
| 5,921,836 A * | 7/1999 | Nanto .................... H01J 9/2277 |
| | | 445/24 |

(Continued)

FOREIGN PATENT DOCUMENTS

| CN | 104324855 A | 2/2015 |
| CN | 105396740 A | 3/2016 |

(Continued)

OTHER PUBLICATIONS

International Search Report (PCT/ISA/210), with translation, and Written Opinion (PCT/ISA/237) dated Mar. 19, 2019, by the Japan Patent Office as the International Searching Authority for International Application No. PCT/JP2018/045842.

(Continued)

*Primary Examiner* — Yewebdar T Tadesse
(74) *Attorney, Agent, or Firm* — Buchanan Ingersoll & Rooney PC

(57) ABSTRACT

An application system includes an application unit including a nozzle configured to discharge a seal agent to a work, and a moving device configured to move the application unit. The moving device includes a movable unit, an elevating unit, and a posture changing unit configured to be raised and lowered by the elevating unit and support the application unit. The nozzle includes a proximal end and a distal end portion configured to discharge the seal agent. The posture changing unit includes a pivot mechanism configured to make the application unit pivot about a vertical axis, and a pivot mechanism configured to make the application unit pivot about a horizontal axis. The vertical axis and the nozzle are located on the same axis, and the vertical axis and the horizontal axis cross on a center axis of the nozzle.

14 Claims, 12 Drawing Sheets

(56) References Cited

U.S. PATENT DOCUMENTS

| | | |
|---|---|---|
| 9,016,598 B2 | 4/2015 | Ikushima |
| 9,849,479 B2 | 12/2017 | Nakamura |
| 2004/0081759 A1* | 4/2004 | Maruyama ............ B05C 5/0216 |
| | | 427/256 |
| 2009/0317554 A1 | 12/2009 | Christensen et al. |
| 2011/0162805 A1 | 7/2011 | Cheng |
| 2014/0234011 A1 | 8/2014 | Tomuta et al. |
| 2016/0067732 A1* | 3/2016 | Nakamura .......... B05B 13/0405 |
| | | 427/427.2 |
| 2016/0158786 A1 | 6/2016 | Christensen |

FOREIGN PATENT DOCUMENTS

| | | |
|---|---|---|
| CN | 105562294 A | 5/2016 |
| CN | 105797917 A | 7/2016 |
| CN | 205701169 U | 11/2016 |
| DE | 3738619 A1 | 6/1989 |
| JP | 2866294 B2 | 3/1999 |
| JP | 2004-021107 A | 1/2004 |
| JP | 2006-081955 A | 3/2006 |
| JP | 2006122740 A | 5/2006 |
| JP | 3828816 B2 | 10/2006 |
| JP | 2007263599 A | 10/2007 |
| JP | 2010253376 A | 11/2010 |
| JP | 2016-055250 A | 4/2016 |
| JP | 2016055250 A | 4/2016 |
| KR | 20040082251 A | 9/2004 |
| KR | 10-2012-0006557 A | 1/2012 |
| WO | 2016125751 A1 | 8/2016 |

OTHER PUBLICATIONS

Extended European Search Report dated Jan. 21, 2021 issued in corresponding European Patent Application No. 18901385.7 (8 pages).

Notice of Non-Final Rejection issued by the Korean Intellectual Property Office in corresponding Korean Patent Application No. 10-2020-7003916 dated Feb. 1, 2021 (11 pages including partial English translation).

Notification of the First Office Action issued by the China National Intellectual Property Administration in corresponding Chinese Patent Application No. 201880052759.0 dated Jan. 28, 2021 (34 pages including partial English translation).

* cited by examiner

APPLICATION SYSTEM, OPERATION SYSTEM, AND POSTURE CHANGING UNIT

CROSS-REFERENCE TO RELATED APPLICATION(S)

This application is a continuation of International Patent Application No. PCT/JP2018/045842 filed on Dec. 13, 2018, which claims priority to and the benefit of Japanese Patent Application No. 2018-005055 filed on Jan. 16, 2018, the entire disclosures of which are incorporated herein by reference.

TECHNICAL FIELD

The present invention relates to a technique of performing an operation for a work and, for example, to an application system configured to apply a seal agent.

BACKGROUND ART

There is proposed a system that applies a seal agent to one of two members to be bonded to each other. For example, Japanese Patent No. 2866294 proposes a system capable of applying a seal agent along the three-dimensional shape of a work by discharging the seal agent from a nozzle while changing the posture of the work. In addition, Japanese Patent Laid-Open No. 2007-263599 or Japanese Patent Laid-Open No. 2006-122740 proposes a system capable of applying a seal agent along the three-dimensional shape of a work by fixing the work and causing a vertical articulated robot to move a nozzle for discharging the seal agent.

In a case in which a relatively large work like a glass member that forms the windshield of an automobile is used as a work as a seal agent application target, if the posture of the work is changed, as in the system of Japanese Patent No. 2866294, an apparatus therefor has a large scale. The systems of Japanese Patent Laid Open No. 2007-263599 and Japanese Patent Laid Open No. 2006-122740 are more advantageous from this viewpoint. In the systems of Japanese Patent Laid Open No. 2007-263599 and Japanese Patent Laid Open No. 2006-122740, however, since a space to install the vertical articulated robot is needed next to a space to fix the work, the occupation area of the system tends to be large. In addition, since the vertical articulated robot controls the direction or position of the nozzle by combining the pivotal movements of a plurality of operation shafts, the control may be complex.

SUMMARY OF INVENTION

It is an object of the present invention to improve the occupation area of a system and easiness of control.

According to an aspect of the present invention, there is provided an application system comprising: an application unit including a nozzle configured to discharge a seal agent to a work; and a moving device configured to move the application unit, wherein the moving device includes: a movable unit provided to be movable in a first horizontal direction along a guide portion extended in the first horizontal direction and including a support portion extending in a second horizontal direction orthogonal to the first horizontal direction; an elevating unit provided to be movable in the second horizontal direction with respect to the support portion; and a posture changing unit configured to be raised and lowered by the elevating unit and support the application unit, the application unit includes a supply portion configured to supply the seal agent to the nozzle, the nozzle includes a proximal end portion to which the seal agent is supplied from the supply portion, and a distal end portion configured to discharge the seal agent, the posture changing unit includes: a first pivot mechanism configured to make the application unit pivot about a vertical axis; and a second pivot mechanism configured to make the application unit pivot about a horizontal axis, and when the application unit is in a posture in which an axial direction of the nozzle faces a vertical direction, the vertical axis and the nozzle are located on the same axis, and the vertical axis and the horizontal axis cross on a center axis of the nozzle.

According to another aspect of the present invention, there is provided an operation system comprising: an operation unit including an operation portion configured to perform an operation for an operation point of a work; and a moving device configured to move the operation unit, wherein the moving device includes: a movable unit provided to be movable in a first horizontal direction along a guide portion extended in the first horizontal direction and including a support portion extending in a second horizontal direction orthogonal to the first horizontal direction; an elevating unit provided to be movable in the second horizontal direction with respect to the support portion; and a posture changing unit configured to be raised and lowered by the elevating unit and support the operation unit, the operation portion is a solid or hollow shaft body, the posture changing unit includes: a first pivot mechanism configured to make the operation unit pivot about a vertical axis; and a second pivot mechanism configured to make the operation unit pivot about a horizontal axis, and when the operation unit is in a posture in which an operation shaft of the operation portion faces a vertical direction, the vertical axis and the operation portion are located on the same axis, and the vertical axis and the horizontal axis cross on a center axis of the operation portion.

According to still another aspect of the present invention, there is provided a posture changing unit provided to be movable in a vertical direction and at least one direction in a horizontal direction and configured to support an operation unit including an operation portion configured to perform an operation for an operation point of a work, wherein the operation portion is a solid or hollow shaft body, the posture changing unit includes: a first pivot mechanism configured to make the operation unit pivot about a vertical axis; and a second pivot mechanism configured to make the operation unit pivot about a horizontal axis, and when the operation unit is in a posture in which an axial direction of the operation portion faces the vertical direction, the vertical axis and the operation portion are located on the same axis, and the vertical axis and the horizontal axis cross on a center axis of the operation portion.

Further features of the present invention will become apparent from the following description of exemplary embodiments (with reference to the attached drawings).

DESCRIPTION OF EMBODIMENTS

Figure 1:
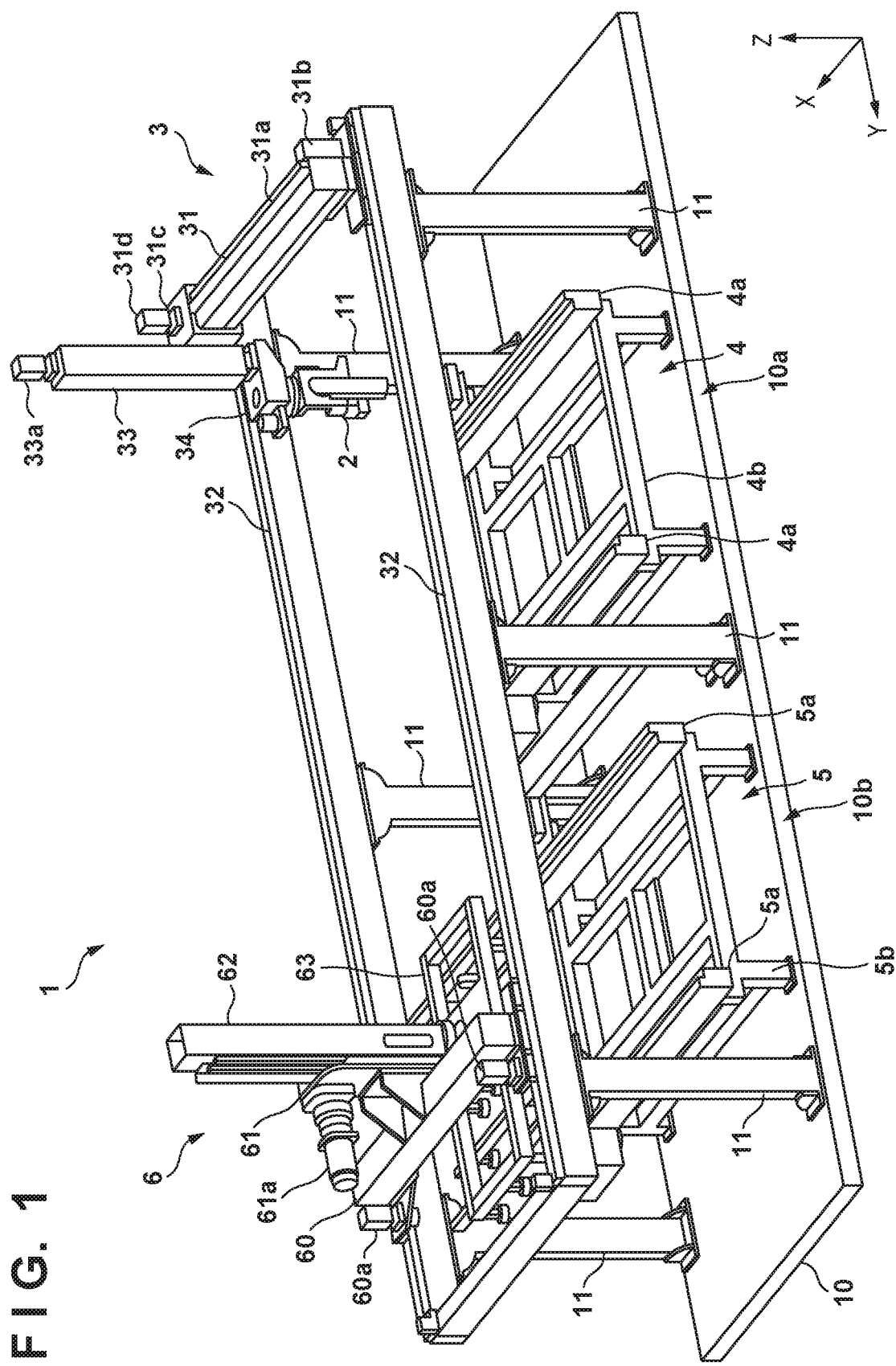
FIG. 1 is a schematic view of an operation system according to an embodiment of the present invention.
Figure 2:
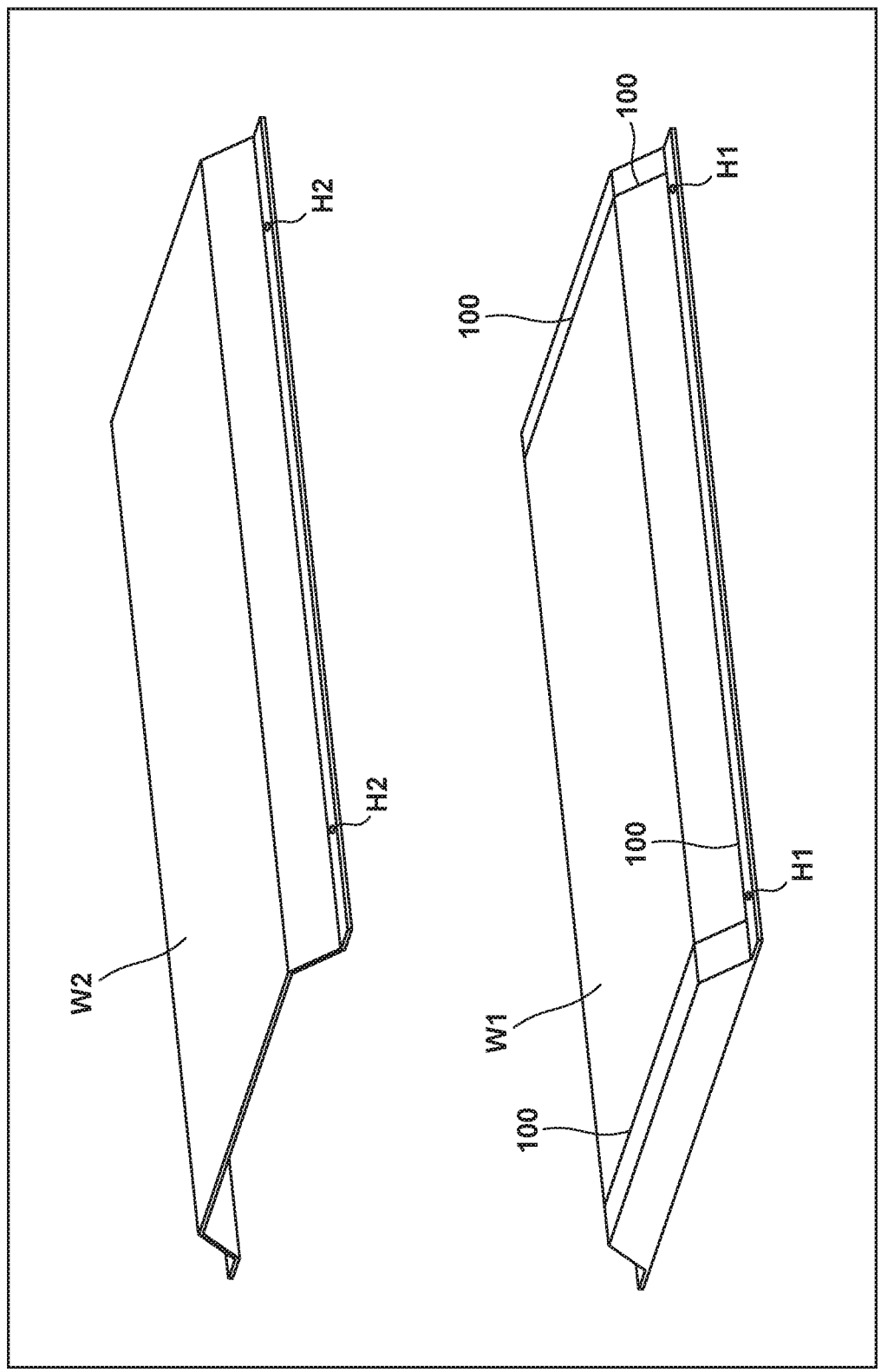
FIG. 2 is a perspective view showing an example of works to be bonded.

FIG. 1 is a schematic view of an operation system 1 according to an embodiment of the present invention. The operation system 1 according to this embodiment is an application system configured to apply a seal agent to one of two works, overlay the work on the other work, and bond them. FIG. 2 is a perspective view showing an example of works as processing targets. A work W2 is an attachment body to be attached to a work W1 as a main body, and is a cover to be placed on the upper side of the work W1 in this embodiment. A plurality of positioning holes H1 are formed in the work W1, and a plurality of positioning holes H2 are formed in the work W2 in correspondence with the positions of the holes H1. The operation system 1 endlessly applies a seal agent 100 along an operation position (seal application position) Wp set on the peripheral edge of the work W1. The seal agent 100 is a kind of adhesive having a seal function. When the work W2 is overlaid from above on the work W1 with the seal agent 100 applied, they can be bonded. Note that in the drawings, arrows X and Y represent horizontal directions orthogonal to each other, and an arrow Z indicates a vertical direction.

Referring back to FIG. 1, the operation system 1 includes a plate-shaped base member 10 that forms the frame of the operation system and defines the occupation area of the operation system 1. The base member 10 has a rectangular shape long in the Y direction. The base member 10 is provided with an installation portion where a plurality of support columns 11 stand. In this embodiment, three lines of support columns 11 are provided apart in the Y direction, and two lines of support columns 11 are provided apart in the X direction. The installation portion is the peripheral edge region of the base member 10. An almost half region on one end side of the base member 10 in the Y direction, on which a support device 4 is installed, is an installation portion 10a, and an almost half region on the other end side, on which a support device 5 is installed, is an installation portion 10b. The installation portion 10a is a region surrounded by a total of four support columns 11 including two support columns 11 at the center in the Y direction and two support columns 11 on the one end side. The installation portion 10b is a region surrounded by a total of four support columns 11 including two support columns 11 at the center in the Y direction and two support columns 11 on the other end side.

The support device 4 is a device configured to support the work W1. In this embodiment, the work W1 is supported via a pallet 8 (FIG. 7 or the like) to be described later. The support device 4 includes a pair of transfer mechanisms 4a, and a frame 4b that supports the pair of transfer mechanisms 4a. The pair of transfer mechanisms 4a are each extended in the X direction and arranged apart in the Y direction, and are mechanisms configured to convey the pallet 8 from one side to the other side in the X direction. The pair of transfer mechanisms 4a are arranged while continuing to conveyance mechanisms (not shown) arranged on both sides of the operation system 1 in the X direction. The pallet 8 (on which the unprocessed work W1 is placed) transferred by the conveyance mechanisms and the pair of transfer mechanisms 4a from the near side (one side) in FIG. 1 is transferred in the X direction from the outside of the system 1 to the inside. After processing, the pallet 8 (on which the works W1 and W2 bonded to each other are placed) is transferred in the X direction (other side) to the outside of the system 1. Each transfer mechanism 4a is, for example, a belt conveyor or a roller conveyor. The support device 4 is arranged under the moving range of movable units 31 and 60 to be described later.

The support device 5 is a device configured to support the work W2. In this embodiment, the work W2 is supported via the pallet 8 (FIG. 7 or the like) to be described later. The support device 5 has the same arrangement as that of the support device 4, and includes a pair of transfer mechanisms 5a, and a frame 5b that supports the pair of transfer mechanisms 5a. The pair of transfer mechanisms 5a are each extended in the X direction and arranged apart in the Y direction, and are mechanisms configured to convey the pallet 8 from one side to the other side in the X direction. The pair of transfer mechanisms 5a are arranged while continuing to conveyance mechanisms (not shown) arranged on both sides of the operation system 1 in the X direction. The pallet 8 (on which the work W2 is placed) transferred by the conveyance mechanisms and the pair of transfer mechanisms 5a from the near side (one side) in FIG. 1 is transferred from the outside of the system 1 to the inside. Each transfer mechanism 5a is, for example, a belt conveyor or a roller conveyor. The support device 5 is arranged under the moving range of the movable unit 60 to be described later.

The operation system 1 includes a moving device 3 that moves an operation unit 2. The moving device 3 includes the movable unit 31, a pair of guide frames 32, an elevating unit 33, and a posture changing unit 34. The pair of guide frames 32 function as a guide portion that guides the movement of the movable unit 31 in the Y direction. The pair of guide frames 32 are each extended in the Y direction and supported by the support columns 11 while being apart in the X direction.

The movable unit 31 is a beam-shaped unit laid on the pair of guide frames 32. The movable unit 31 includes a support portion 31a extending in the X direction, and driving portions 31b arranged at the two ends of the support portion 31a in the X direction. FIG. 1 shows only one driving portion 31b. Each driving portion 31b includes a motor as a driving source, and exhibits a traveling force with respect to the guide frames 32. As the transmission mechanism of the driving force of the motor, the guide frame 32 is provided with, for example, a rack or a ball screw shaft, and the driving portion 31b includes a pinion meshed with the rack or a ball nut meshed with the ball screw shaft. When the two driving portions 31b are synchronously driven and controlled, the movable unit 31 can translate in the Y direction by the guide of the pair of guide frames 32.

On the support portion 31a, a slider 31c is provided to be movable in the X direction. The support portion 31a functions as a guide frame that guides the movement of the slider 31c. The slider 31c is provided with a driving portion 31d. The driving portion 31d includes a motor as a driving source, and the slider 31c travels along the support portion 31*a*. As the transmission mechanism of the driving force of the motor, the support portion 31*a* is provided with, for example, a rack or a ball screw shaft, and the driving portion 31*d* includes a pinion meshed with the rack or a ball nut meshed with the ball screw shaft.

Note that the movable unit 31 is a beam-shaped unit in this embodiment but may be a gate-shaped unit. In this case, an arrangement corresponding to the pair of guide frames 32 is supported on the base member 10 without using the plurality of support columns 11.

The elevating unit 33 is fixed to the slider 31*c*. When the slider 31*c* moves, the elevating unit 33 is moved in the X direction along the support portion 31*a*. The elevating unit 33 includes a driving portion 33*a*. The driving portion 33*a* includes a motor as a driving source. The posture changing unit 34 and the operation unit 2 are moved (raised and lowered) in the Z direction by the driving force of the motor. As the elevating mechanism, a ball screw mechanism or a rack-pinion mechanism can be employed.

With the above-described arrangement, the operation unit 2 and the posture changing unit 34 can translate in the X, Y, and Z directions. Note that in this embodiment, the operation unit 2 and the posture changing unit 34 are movable in two horizontal directions (X and Y). As for the horizontal direction, they may be movable only in the X direction or only in the Y direction in accordance with the purpose of an operation.

Figure 3:
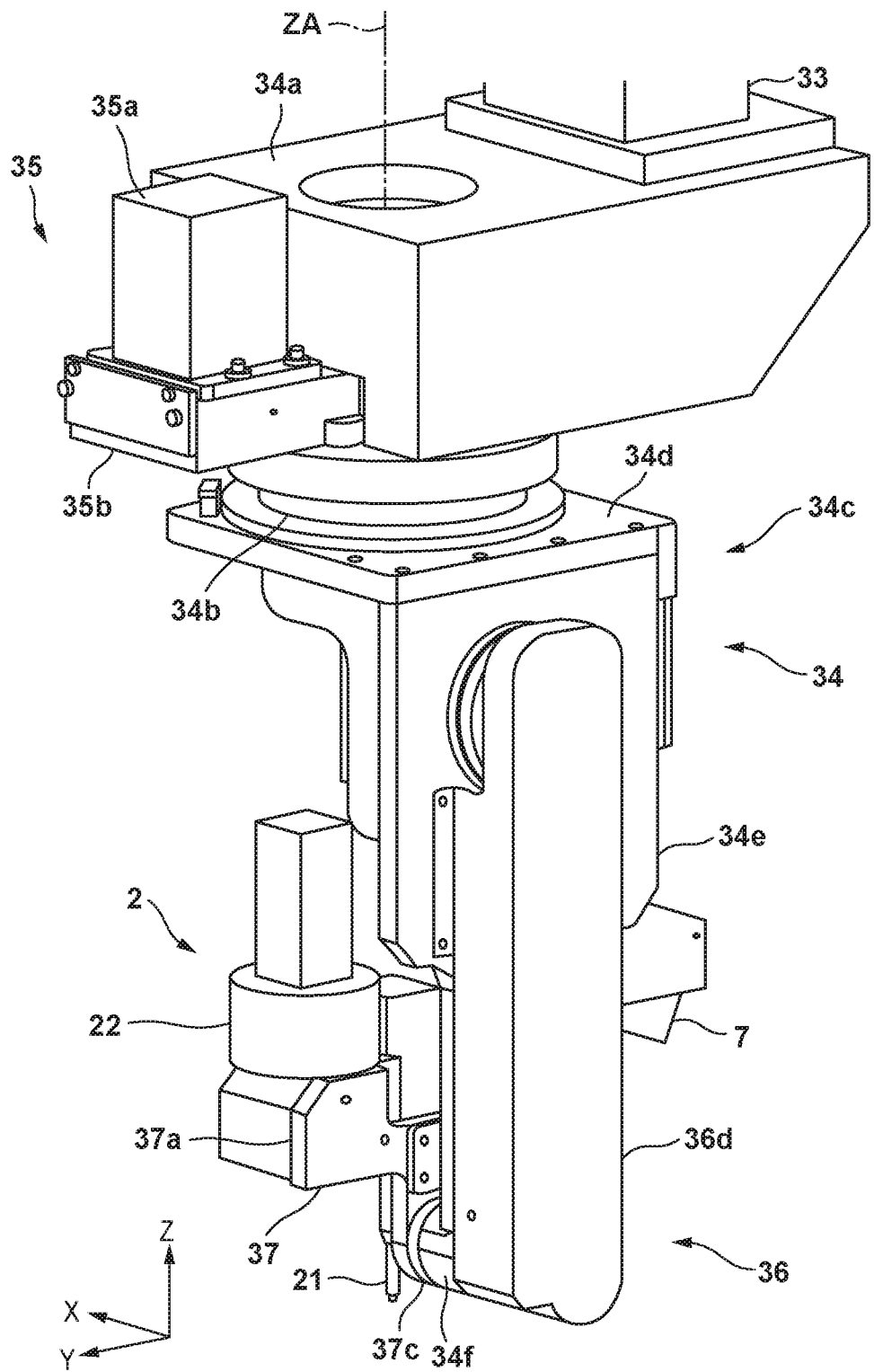
FIG. 3 is a perspective view of a posture changing unit and an operation unit.
Figure 4:
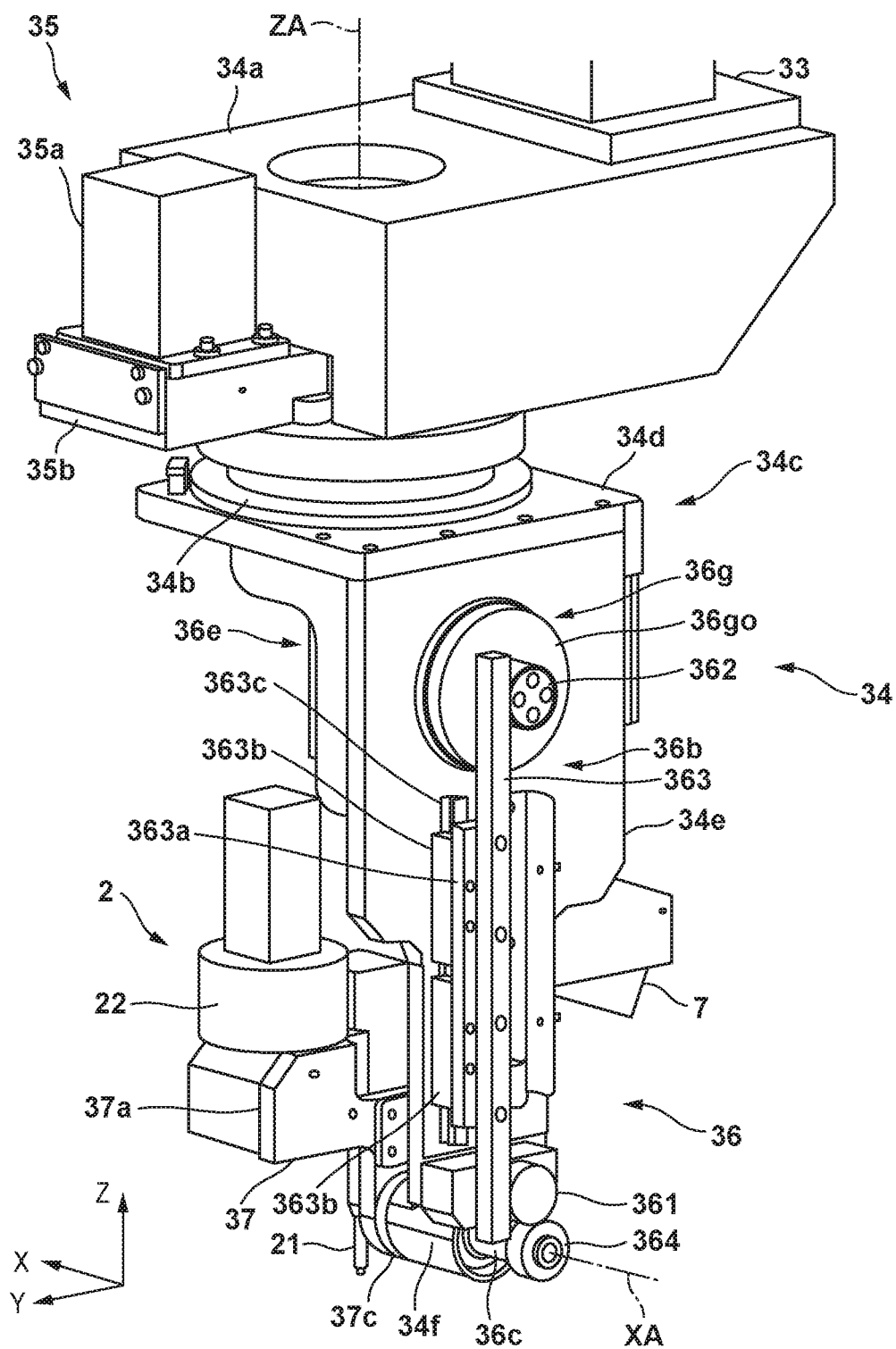
FIG. 4 shows a partially exploded perspective view of the posture changing unit and a perspective view of the operation unit.
Figure 5:
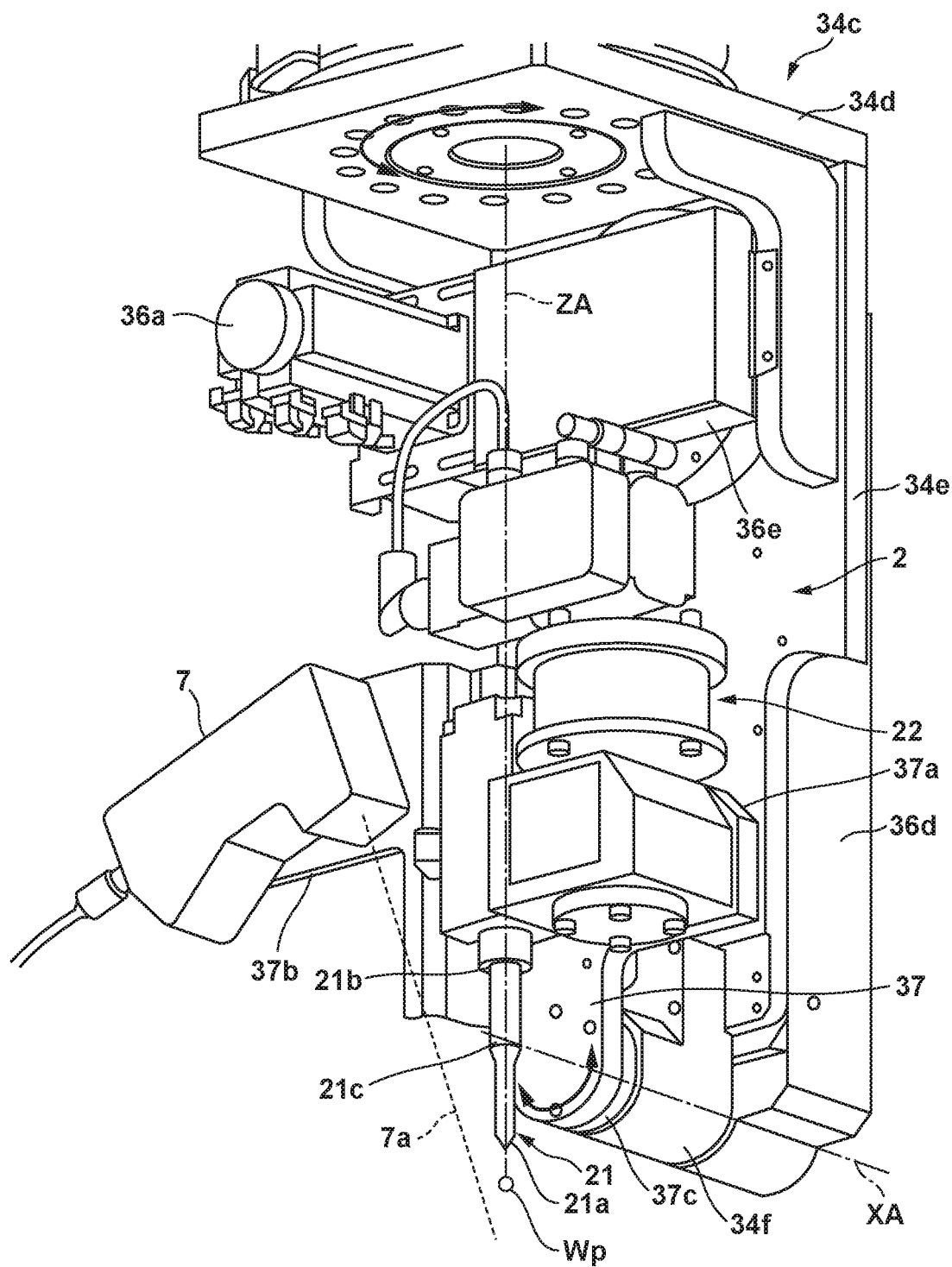
FIG. 5 is a perspective view of the posture changing unit, the operation unit, and a measuring unit.

The operation unit 2 and the posture changing unit 34 will be described with reference to FIGS. 3 to 5 in addition to FIG. 1. FIG. 3 is a perspective view of the posture changing unit 34 and the operation unit 2 supported by the posture changing unit 34. FIG. 4 shows a state in which a cover 36*d* of the posture changing unit 34 is detached in the perspective view of FIG. 3. FIG. 5 is a perspective view of the posture changing unit 34 and the operation unit 2 viewed from a different line of sight, and also shows the outer appearance of a measuring unit 7.

The operation unit 2 is an application unit that applies the seal agent 100 to the work W1. The operation unit 2 includes a nozzle 21 that discharges the seal agent 100, and a supply portion 22 that supplies the seal agent 100 (see FIG. 2) to the nozzle 21. In addition, the operation unit 2 includes an application control apparatus (a control apparatus 9B shown in FIG. 12) that controls discharge of the seal agent 100 from the nozzle 21. The nozzle 21 is an operation portion that performs an operation of discharging the seal agent 100. The nozzle 21 is a hollow shaft body, and is a cylindrical tube including a distal end portion 21*a* and a proximal end portion 21*b*. The proximal end portion 21*b* is connected to the supply portion 22, and the seal agent 100 is supplied from the supply portion 22. The seal agent 100 pressure-fed by the supply portion 22 to the proximal end portion 21*b* is discharged from the opening of the distal end portion 21*a*. The supply portion 22 is connected to the supply source (not shown) of the seal agent 100 via a pipe. The supply portion 22 includes a storage portion that stores the seal agent 100, and a driving mechanism that pressure-feeds the seal agent 100 in the storage portion to the nozzle 21.

The control apparatus 9B controls the start and stop of discharge of the seal agent 100 from the nozzle 21, and the discharge amount of the seal agent 100. In addition, the control apparatus 9B communicates with a control apparatus 9A (FIG. 12) (to be described later) that controls the operations of the moving device 3 and the posture changing unit 34, and controls the discharge amount of the seal agent 100 in accordance with the moving speed of the distal end of the nozzle 21. When the operation unit 2 includes the storage portion and the control apparatus 9B, the influence of the temperature of the seal agent or a pressure change in a supply path to supply the seal agent can be prevented, and the discharge amount of the seal agent 100 can more accurately be controlled. As the operation unit 2, a known application unit can be employed.

The measuring unit 7 is a sensor configured to measure the application state of the seal agent 100 discharged from the nozzle 21. In this embodiment, the measuring unit 7 is a range finder that emits a laser beam 7*a* and measures reflected light. The irradiation destination of the laser beam 7*a* is set on an almost extended line in the axial direction of the nozzle 21. When the shape (thickness, width, and the like) of the seal agent 100 discharged onto the work W1 is monitored by the measuring unit 7, it is possible to determine whether the seal agent 100 is appropriately applied or not, for example, whether a discharge error of the seal agent 100 has occurred or not. For example, as for the thickness, the height of the applied seal agent 100 is monitored with reference to the seal application position Wp. Concerning the width, the width of the applied seal agent 100 is monitored with reference to a preset installation value, thereby performing the determination.

The posture changing unit 34 includes an upper frame 34*a*, a lower frame 34*c*, and a connecting portion 34*b* that connects them such that they can pivot about an axis ZA in the Z direction. The upper frame 34*a* is fixed to the lower end of the elevating unit 33, and the posture changing unit 34, the operation unit 2 and the measuring unit 7 are raised and lowered as a whole by the elevating unit 33.

The upper frame 34*a* is provided with a pivot mechanism 35. The pivot mechanism 35 is a mechanism configured to make the lower frame 34*c* pivot about the axis ZA with respect to the upper frame 34*a*, and includes a motor 35*a* that is a driving source, and a transmission mechanism 35*b*. The transmission mechanism 35*b* is, for example, a belt transmission mechanism, and includes a driving pulley to be driven by the motor 35*a*, and a driven pulley on the rotating shaft side, which is provided in the connecting portion 34*b* and fixed to the lower frame 34*c*. The lower frame 34*c* is made to pivot about the axis ZA by driving the motor 35*a*.

The lower frame 34*c* includes a plate-shaped horizontal support member 34*d*, and a plate-shaped vertical support member 34*e*. The end of the horizontal support member 34*d* on one side and the upper end of the vertical support member 34*e* are connected, and these members are combined in an inverted L shape. The connecting portion 34*b* (its rotating shaft) is connected to the center portion of the horizontal support member 34*d*. The upper end of the vertical support member 34*e* is fixed to the end of the horizontal support member 34*d* on one side and extended downward. The lower end of the vertical support member 34*e* is provided with a cylindrical pivotal support portion 34*f* extending in the horizontal direction, and a support member 37 is connected via the pivotal support portion 34*f*.

The support member 37 is a member that supports the operation unit 2 and the measuring unit 7. The support member 37 is located on the lower side of the lower frame 34*c* having the inverted L shape, and includes a fixed portion 37*a* to which a side portion of the supply portion 22 of the operation unit 2 is fixed, and a fixed portion 37*b* to which the measuring unit 7 is fixed. The fixed portion 37*a* is a plate-shaped member, and the fixed portion 37*b* is a bracket attached to the plate-shaped member that forms the fixed portion 37*a*. A shaft-shaped connecting portion 37*c* extending in the horizontal direction is provided at the lower end of the support member 37. The connecting portion 37*c* is coaxially connected to the pivotal support portion 34f. The support member 37 can pivot about an axis XA in the horizontal direction, which is the center axis of the pivotal support portion 34f and the connecting portion 37c. That is, the operation unit 2, the measuring unit 7, and the support member 37 can integrally pivot about the axis XA.

The vertical support member 34e is provided with a pivot mechanism 36. The pivot mechanism 36 is a mechanism that makes the support member 37 pivot about the axis XA with respect to the lower frame 34c, and includes a motor 36a that is a driving source, a transmission mechanism 36e, a transmission mechanism 36b, and a rotating shaft 36c. The motor 36a is arranged on the other side surface (the surface on the lower side of the lower frame 34c having the inverted L shape) of the vertical support member 34e, and the transmission mechanism 36b and the rotating shaft 36c are arranged on one side surface of the vertical support member 34e. When the constituent elements of the pivot mechanism 36 are divisionally arranged on the two side surfaces of the vertical support member 34e, the installation space of the transmission mechanism 36b can be made compact, and the support balance by weight distribution can be implemented.

The transmission mechanism 36e is a relay transmission mechanism that transmits the driving force of the motor 36a to the transmission mechanism 36b, and is formed on the vertical support member 34e. The transmission mechanism 36e includes a transmission element 36g (for example, a reduction gear) that is provided between the motor 36a and a driving gear 362 and transmits the driving force of the motor 36a at a predetermined ratio. The transmission element 36g includes a transmission input portion (not shown) connected to the output shaft of the motor 36a, a transmission output portion 36go to which the driving gear 362 is connected, and a transmission attachment portion (not shown) attached to the vertical support member 34e. The transmission output portion 36go is rotatably attached to the vertical support member 34e via an opening formed in the vertical support member 34e. The rotating shaft 36c is a horizontal shaft fixed to the connecting portion 37c and is located at the lower end of the vertical support member 34e.

In this embodiment, the transmission mechanism 36b is a rack-pinion mechanism including the driving gear 362, a rack 363, and driven gears 361 and 364. The driving gear 362 is meshed with the rack 363. The rack 363 is a member with gear teeth arranged in the Z direction and is fixed to one side surface of a plate-shaped bracket 363a. The other side surface of the bracket 363a is provided with a plurality of sliders 363b arranged apart in the Z direction. A rail member 363c extending in the Z direction is fixed to the vertical support member 34e. The plurality of sliders 363b are engaged with the rail member 363c and slid along the rail member 363c. With these arrangements, the rack 363 is supported by the vertical support member 34e to be movable in the Z direction. The pivotal movement of the driving gear 362 caused by the driving of the motor 36a is transmitted to the rack 363, and the rack 363 is moved in the vertical direction. Note that the transmission mechanism 36b is not limited to the rack-pinion mechanism, and may be a transmission mechanism of another type such as a belt transmission mechanism.

The driven gear 361 is supported on the lower portion of the vertical support member 34e to be rotatable with respect to the vertical support member 34e, and is meshed with the rack 363. When the rack 363 rises or lowers, the driven gear 361 pivots. The driven gear 364 is fixed to an end of the rotating shaft 36c and meshed with the driven gear 361. The driven gear 364 is connected to the connecting portion 37c via the rotating shaft 36c. Hence, the rotation of the driving gear 362 is transmitted to the driven gear 364 via the rack 363 and the driven gear 361 and further transmitted to the connecting portion 37c via the rotating shaft 36c. By this mechanism, when the motor 36a is made to pivot, the support member 37 can be made to pivot about the axis XA. In this embodiment, the support member 37 is made to pivot in a direction reverse to the pivotal movement of the motor 36a.

In this embodiment, the pivotal support portion 34f is provided at the lower end of the vertical support member 34e to support the connecting portion 37c. On the other hand, the motor 36a is arranged on the upper side of the lower end of the vertical support member 34e, particularly, on the upper portion of the vertical support member 34e. In other words, the motor 36a is arranged at a position apart upward from the nozzle 21. This helps in preventing the motor 36a from interfering with the work W1 when the seal agent 100 is discharged from the nozzle 21 to the work W1. The motor 36a is one of components with large sizes among the members that constitute the device, and is one of components whose interference with the work W1 should be taken into consideration. If the motor 36a is arranged near the nozzle 21, interference between the motor 36a and the work W1 occurs. It is therefore difficult to make the nozzle 21 approach the work W1 and discharge the seal agent 100. In this embodiment, the transmission mechanism 36b is provided to keep the motor 36a apart from the nozzle 21. It is therefore possible to prevent the motor 36a and the work W1 from interfering with each other and make the nozzle 21 approach the work W1 and discharge the seal agent 100.

The periphery of the transmission mechanism 36b is covered with the cover 36d, whereby sticking of foreign substances to the transmission mechanism 36b is suppressed. The cover 36d is fixed to the vertical support member 34e.

With the above-described arrangement, the pivot mechanism 35 makes the operation unit 2 pivot about the axis ZA, and the pivot mechanism 36 makes the operation unit 2 pivot about the axis XA. It is therefore possible to change the direction of the nozzle 21, that is, the discharge direction of the seal agent 100 to an arbitrary direction. In this embodiment, since the measuring unit 7 is made to pivot integrally with the operation unit 2 while maintaining the relative positional relationship to the operation unit 2, it is possible to always stably measure the application state of the seal agent 100 without depending on the posture of the operation unit 2.

The positional relationship between the axis ZA, the axis XA, and the nozzle 21 will be described here with reference to FIG. 5. FIG. 5 shows a case in which the operation unit 2 is in an initial posture (or reference posture) in which the axial direction of the nozzle 21 is directed downward in the Z direction. In the initial posture, the center axis of the nozzle 21 and the axis ZA are located on the same axis. In addition, the axis ZA and the axis XA cross on a portion 21c of the nozzle 21. Here, since the distance between the portion 21c of the nozzle 21 and the distal end portion 21a is known, the position of the distal end portion 21a when the posture of the operation unit 2 is changed can easily be obtained by calculation. For this reason, for example, even if the posture of the operation unit 2 is changed, the distance between the position of the distal end portion 21a and the seal application position Wp can be maintained at a distance at which the they do not interfere with each other, and the seal agent to be supplied can stably be supplied. As a result, application control of the seal agent 100 to the work W1 can relatively easily be performed. In addition, the discharge amount of the seal agent 100 is controlled in accordance with the moving speed (a speed obtained by adding the moving speed of the operation unit 2 by the moving device 3 to the peripheral speed of the distal end portion 21a about the axis XA) of the distal end portion 21a in posture change (in particular, a posture change about the axis XA) of the nozzle 21.

In this embodiment, the portion 21c is at a position apart from both the distal end portion 21a and the proximal end portion 21b, and is located at the intermediate portion of the nozzle 21 in the axial direction. The portion 21c that is the intersection between the axis ZA (the center axis of the nozzle 21 in the initial posture) and the axis XA is not limited to this embodiment, and may be located at, for example, the distal end portion 21a. In this case, even if the posture of the operation unit 2 is changed, and the posture of the nozzle 21 is changed, the position of the distal end portion 21a of the nozzle 21 is always constant. It is therefore unnecessary to perform calculation and control of the application position of the seal agent 100 to the work W1. On the other hand, the distance between the work W1 and peripheral components such as the pivotal support portion 34f becomes short. For this reason, to avoid interference between the work W1 and the peripheral components, the distal end portion 21a of the nozzle 21 cannot made to sufficiently approach the work W1. To avoid the interference with the work W1, the portion 21c is preferably a portion apart from the distal end portion 21a to the side of the proximal end portion 21b.

The portion 21c that is the intersection between the axis ZA and the axis XA may be located in the proximal end portion 21b. In this case, since the interference between the peripheral components and the work W1 is hardly problematic, the distal end portion 21a of the nozzle 21 can be made to sufficiently approach the work W1. On the other hand, when changing the posture of the operation unit 2, the change amount of the position of the distal end portion 21a becomes large. For this reason, depending on the shape of the work W1, it may be difficult to continuously apply the seal agent 100 while moving the operation unit 2.

In the view of the above-described points, locating the portion 21c at the intermediate portion of the nozzle 21 in the axial direction, as in this embodiment, is well-balanced in terms of avoiding interference with the work W1 and continuously applying the seal agent 100.

Referring back to FIG. 1, the operation system 1 includes a conveyance device 6 configured to convey the work W2 from the support device 5 to the support device 4. The conveyance device 6 includes the movable unit 60, an elevating unit 61, a pivot unit 62, and a holding unit 63. In this embodiment, the pair of guide frames 32 are also used as a guide portion that guides the movement of the movable unit 60 in the Y direction. However, a guide portion exclusive for the movable unit 60 may be provided.

The movable unit 60 is a beam-shaped unit laid on the pair of guide frames 32. Driving portions 60a are provided at the two ends of the movable unit 60 in the X direction. Each driving portion 60a includes a motor as a driving source, and the movable unit 60 travels along the guide frames 32. When the two driving portions 60a are synchronously driven and controlled, the movable unit 60 can translate in the Y direction by the guide of the pair of guide frames 32.

Note that the movable unit 60 is a beam-shaped unit in this embodiment but may be a gate-shaped unit.

The elevating unit 61 is provided at an arbitrary position (the center portion in FIG. 1) of the movable unit 60 in the X direction, and raises and lowers the pivot unit 62. The elevating unit 61 includes a driving portion 61a. The driving portion 61a includes a motor as a driving source, and moves (raises and lowers) the pivot unit 62 in the Z direction by the driving force of the motor. As the elevating mechanism, a ball screw mechanism or a rack-pinion mechanism can be employed.

The pivot unit 62 is a columnar elevating body to be raised and lowered by the elevating unit 61, and also includes, at its lower end, a mechanism (for example, a motor and a reduction gear) configured to make the holding unit 63 pivot about the Z-axis.

The holding unit 63 is a unit that is supported at the lower end of the pivot unit 62 and holds the work W2 on the support device 5. The holding unit 63 is raised and lowered by driving the elevating unit 61, and the direction of the holding unit 63 on a plane orthogonal to the Z-axis can be corrected by driving the pivot unit 62.

Figure 6:
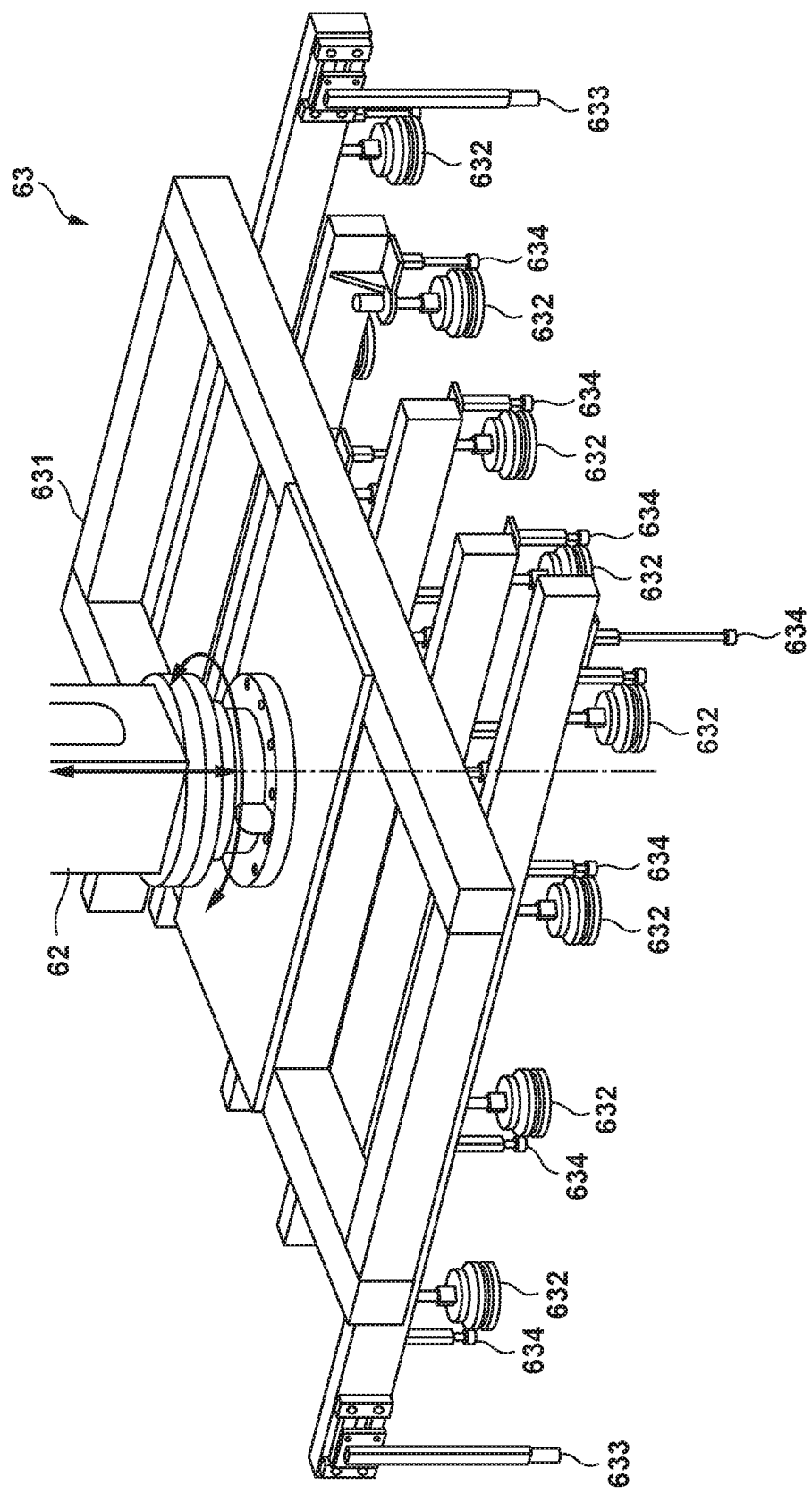
FIG. 6 is a perspective view of a holding unit.

FIG. 6 is a perspective view of the holding unit 63. The holding unit 63 includes a frame 631 connected to the lower end of the pivot unit 62. A plurality of holding portions 632 configured to hold the work W2 are supported by the frame 631. The holding portions 632 suck the work W2 by, for example, suction of air. The frame 631 is also provided with a plurality of positioning portions 633 and 634 that position the work W2 to be held. The plurality of positioning portions 633 are shaft-shaped members, and are fitted in the positioning holes H2 of the work W2 to do positioning in the X and Y directions (positioning in the horizontal direction). The plurality of positioning portions 634 are rod-shaped members, and abut against the upper surface of the work W2 to do positioning upward in the Z direction. The plurality of positioning portions 634 have different lengths according to the heights between the abutment portion and the frame 631.

Figure 7:
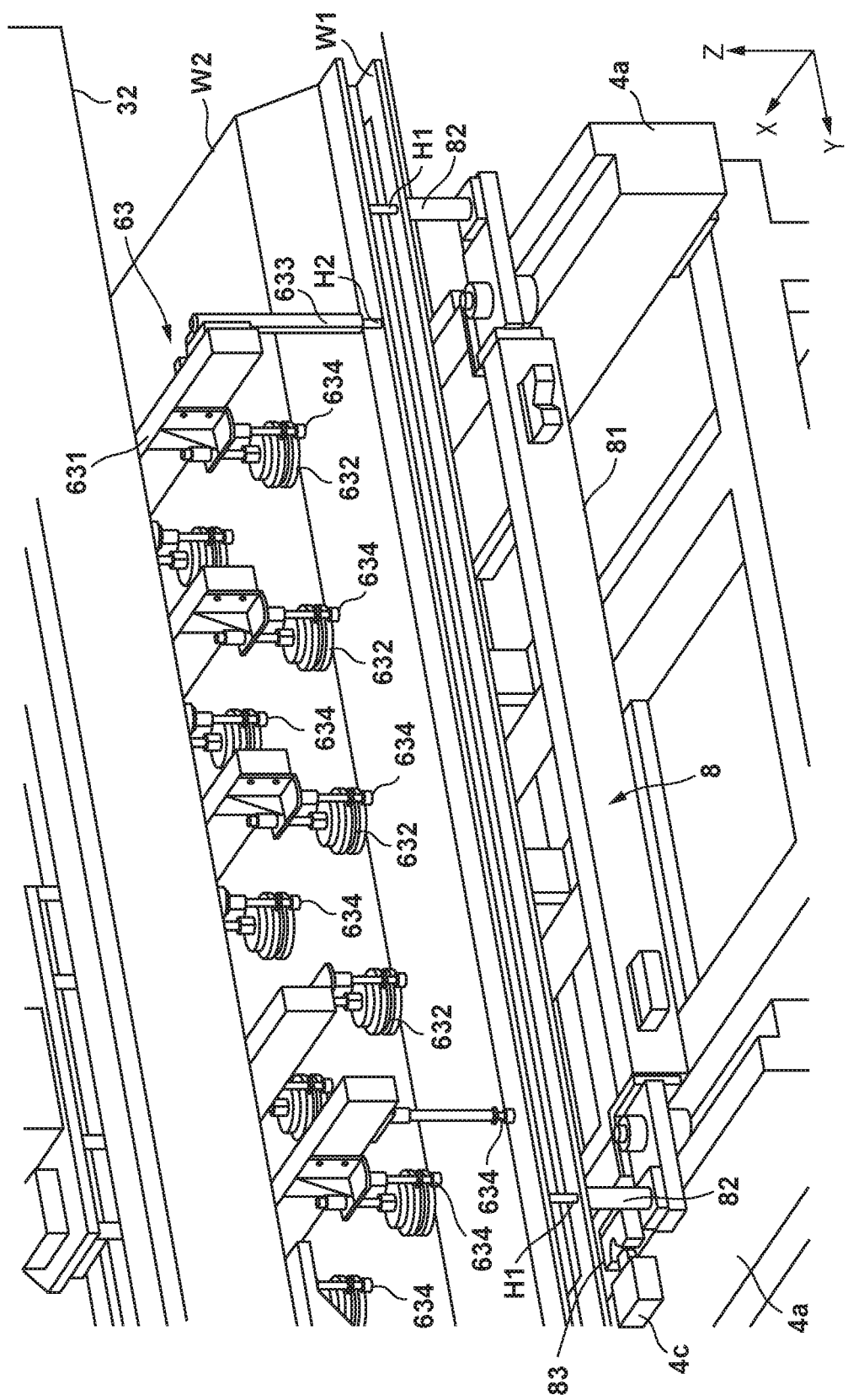
FIG. 7 is a view showing a positioning form of a work.

FIG. 7 shows an example of the holding form of the work W2 by the holding unit 63. The example of FIG. 7 shows a process of overlaying the work W2 on the work W1 supported on the support device 4 via the pallet 8. As shown in FIG. 7, when the plurality of holding portions 632 suck the upper surface of the work W2, the work W2 is supported by the holding unit 63. In addition, the positioning portions 633 are fitted in the holes H2 to maintain positioning in the X and Y directions. Furthermore, the distal ends of the positioning portions 634 abut against the upper surface of the work W2 to maintain positioning in the Z direction. The upper surface of the work W2 has a three-dimensional shape. When the plurality of positioning portions 634 of different lengths abut, positioning in the Z direction can accurately be performed.

Note that the work W1 is positioned on the pallet 8 as follows. That is, in the pallet 8, shaft-shaped positioning portions 82 stand on a frame 81 that forms the main body. The positioning portions 82 are fitted in the positioning holes H1 of the work W1, and positioning between the pallet 8 and the work W1 is thus done. The frame 81 also includes an abutment portion 83 projecting sideward. A V-shaped notch is formed in the abutment portion 83. The support device 4 is provided with a positioning portion 4c. The positioning portion 4c includes an abutment piece that abuts against the V-shaped notch of the abutment portion 83, and an actuator (for example, an air cylinder or an electric cylinder) configured to make the abutment piece enter in or retreat from the notch. FIG. 7 shows a state in which the positioning portion 4c abuts against the abutment portion 83 to position the pallet 8 in the horizontal direction. Note that the support device 5 is also provided with a positioning portion (not shown) similar to the positioning portion 4c.

Figure 12:
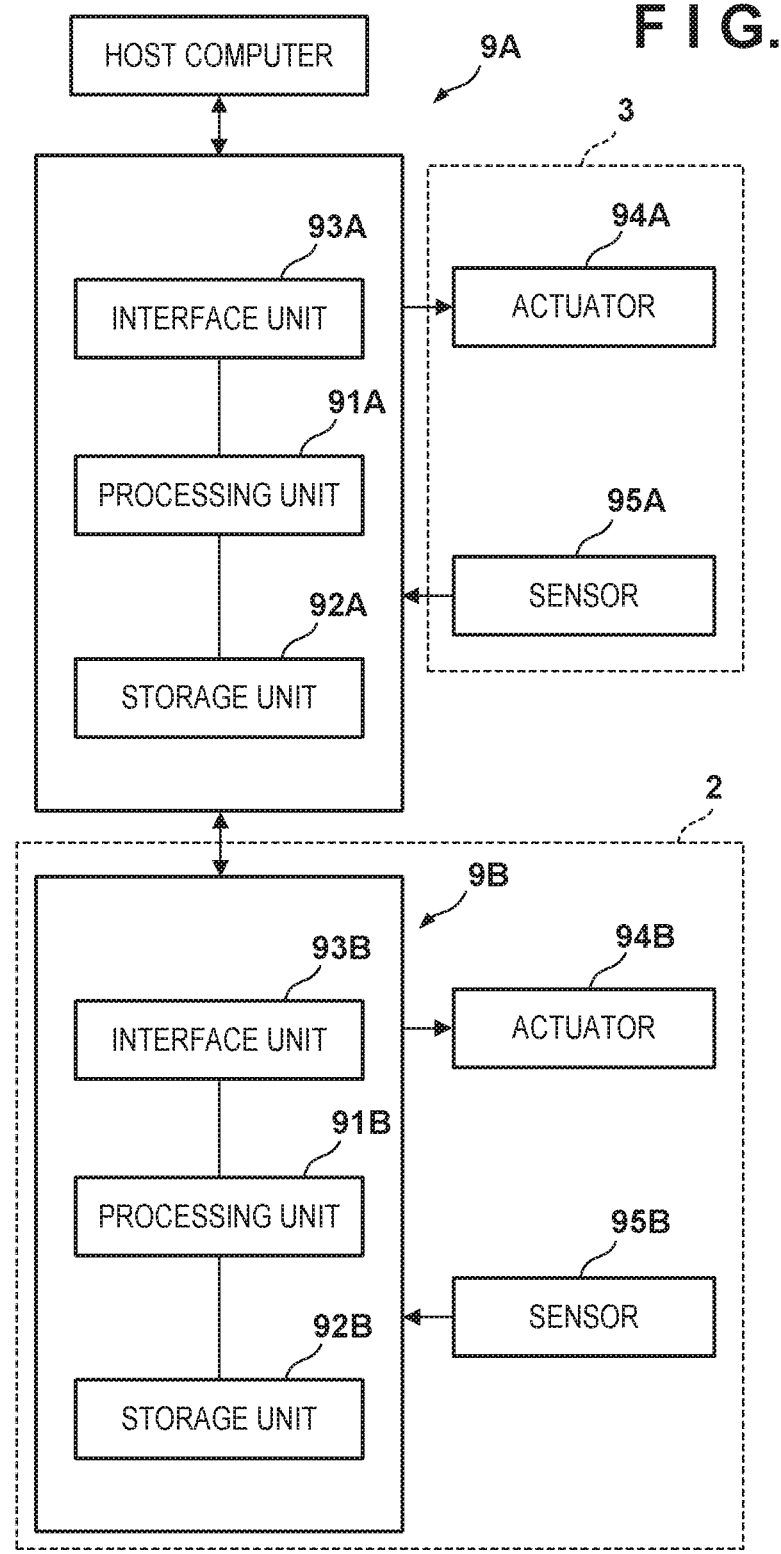
FIG. 12 is a block diagram of the control apparatuses of the operation system shown in FIG. 1.

The arrangement of the control apparatus 9A and the control apparatus 9B of the operation system 1 will be described next with reference to FIG. 12. In this embodiment, the control apparatus 9A mainly controls the position and the posture of the nozzle 21 and the control apparatus 9B mainly controls the discharge amount of the seal agent. However, an arrangement that performs these control operations by one control apparatus can also be employed.

The control apparatus 9A includes a processing unit 91A such as a CPU, a storage unit 92A such as a RAM or a ROM, and an interface unit 93A that interfaces an external device and the processing unit 91A. The interface unit 93A also includes a communication interface that performs communication with a host computer and communication with an interface unit 93B of the control apparatus 9B. The host computer is, for example, a computer that controls management of a whole manufacturing facility in which the operation system 1 is arranged.

The processing unit 91A executes a program stored in the storage unit 92A, and controls various kinds of actuators 94A that are output devices based on the detection results of various kinds of sensors 95A that are input devices and an instruction of the host computer or the like. The storage unit 92A also stores information concerning application of the seal agent, such as coordinate information of the application path of the seal agent 100 corresponding to the type of the work as the processing target. The various kinds of sensors 95A include, for example, the above-described measuring unit 7, a sensor configured to detect the position of a movable component, and the like. The various kinds of actuators 94A include the above-described various kinds of motors, and the like.

The control apparatus 9B includes a processing unit 91B such as a CPU, a storage unit 92B such as a RAM or a ROM, and an interface unit 93B that interfaces an external device and the processing unit 91B. The interface unit 93B also includes a communication interface that performs communication with the control apparatus 9A.

The processing unit 91B executes a program stored in the storage unit 92B, and controls various kinds of actuators 94B that are output devices based on the detection results of various kinds of sensors 95B that are input devices and communication with the control apparatus 9A. The storage unit 92B also stores information concerning application of the seal agent, such as a discharge amount corresponding to the type of the seal agent. The various kinds of sensors 95B include, for example, sensors configured to detect the temperature around the operation unit 2 and the amount of the supplied seal agent 100, and the like. The various kinds of actuators 94B include various kinds of actuators configured to control the discharge of the supplied seal agent 100, and the like.

<Example of Control>

Figure 8:
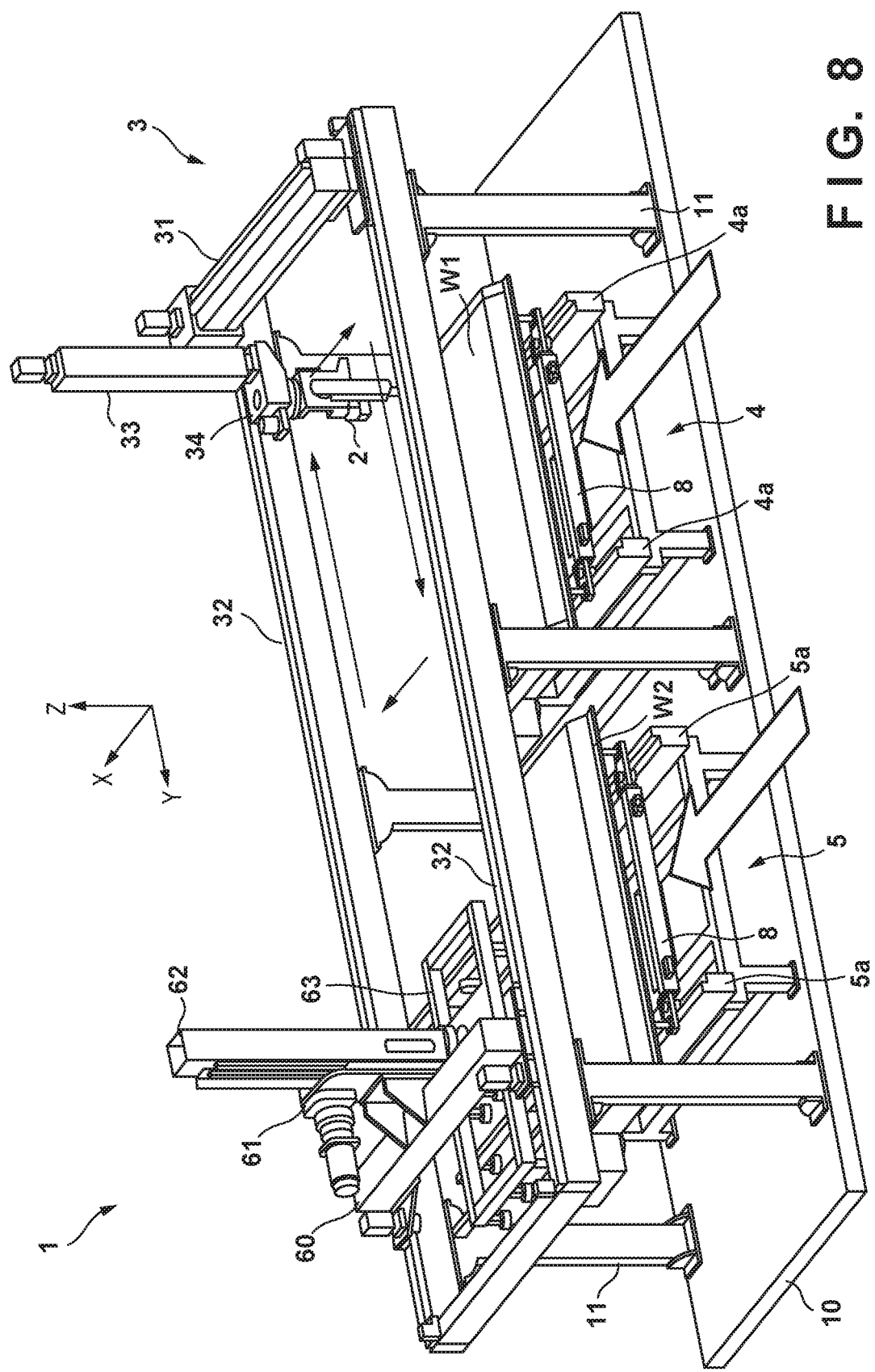
FIG. 8 is an operation explanatory view of the operation system shown in FIG. 1.

An example of the operation of the operation system 1 under the control of the control apparatuses 9A and 9B will be described with reference to FIGS. 8 to 11. FIG. 8 shows a transfer operation of the works W1 and W2 into the system and an application operation of the application head 2. The works W1 and W2 are transferred to the support devices 4 and 5 via conveyance mechanisms (not shown), respectively. At the time of transfer, the transfer mechanisms 4a of the support device 4 receive the pallet 8 with the work W1 placed on it and position the pallet 8. In addition, the transfer mechanisms 5a of the support device 5 receive the pallet 8 with the work W2 placed on it and position the pallet 8.

Figure 9:
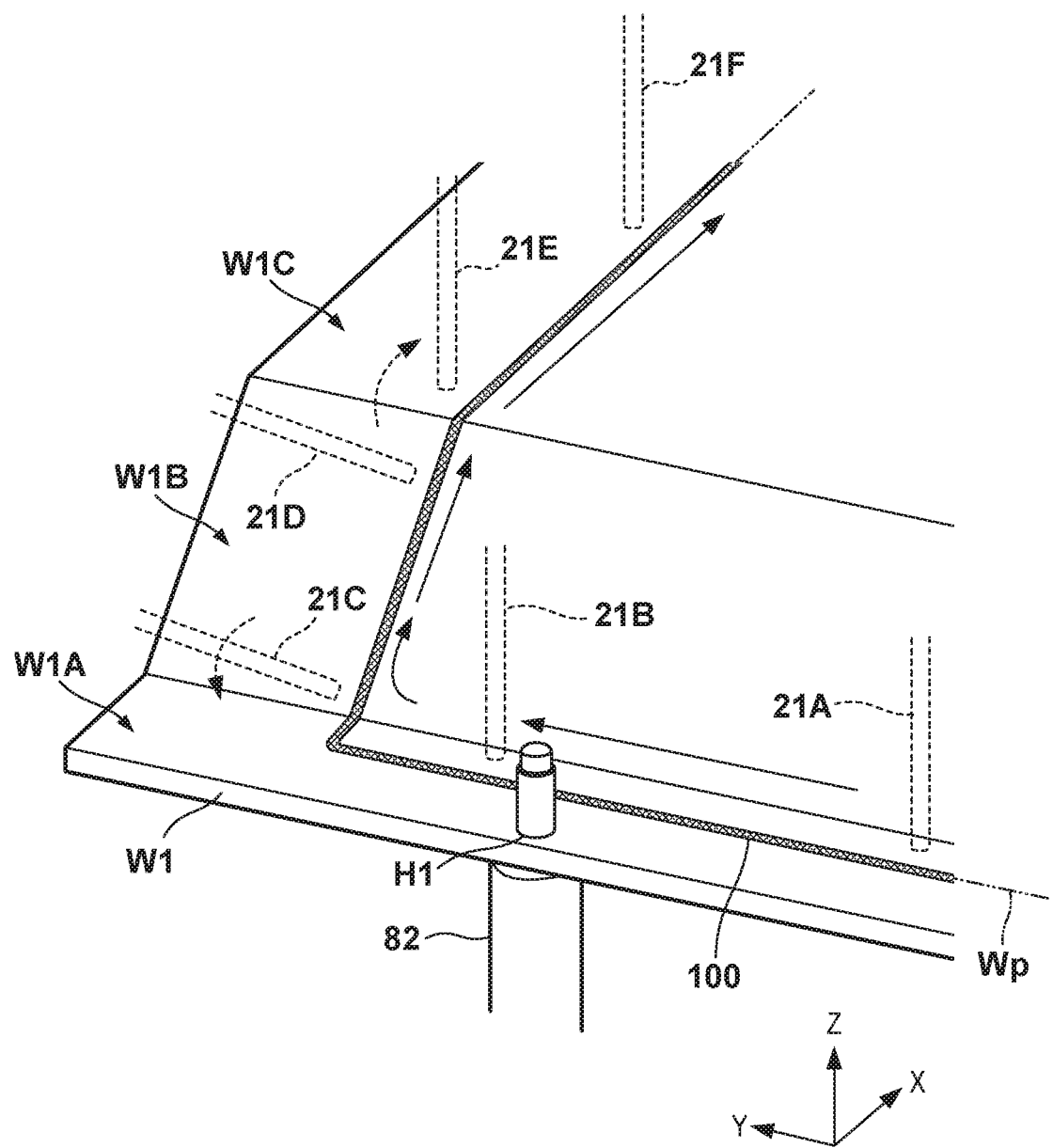
FIG. 9 is an operation explanatory view showing an example of the movement and posture change of a nozzle.

When the work W1 is transferred onto the support device 4, application of the seal agent 100 to the work W1 is performed by the operation unit 2 and the moving device 3. The application operation is performed by, for example, discharging the seal agent 100 from the nozzle 21 while moving the operation unit 2. The operation unit 2 is made to pivot about the axis ZA and the axis XA in correspondence with the shape of the work W1 while being moved in the X, Y, and Z directions by the moving device 3, thereby changing the posture. FIG. 9 is a schematic view showing an example of a posture change. Discharge of the seal agent 100 can be either of, for example, a discontinuous discharge type that intermittently discharges a predetermined amount like an inkjet nozzle or a continuous discharge type that continuously discharges a predetermined amount.

The tilt of the nozzle 21 is controlled such that, for example, the nozzle 21 is always in a state in which it stands in the normal direction of the surface of the work W1. In the example of FIG. 9, application of the seal agent 100 by the nozzle 21 is performed along the seal application position Wp set on surfaces W1A, W1B, and W1C of the work W1. Note that the application operation of the seal agent by the nozzle 21 is performed in a state in which the nozzle 21 is set apart from the work W1 by a predetermined distance so the nozzle 21 does not come into contact with the work W1. First, on the surface W1A, the nozzle 21 is set upright in a posture perpendicular to the surface W1A, like a nozzle 21A or 21B. The nozzle 21A or 21B in the upright state is moved in the Y direction. The seal agent 100 is thus applied to the surface W1A. After completion of application to the surface W1A, application of the seal agent 100 to the surface W1B that is a tilted surface is performed. At this time, the nozzle 21A or 21B set upright is tilted to tilt its upper portion backward. More specifically, the pivot mechanism 36 is driven to make the nozzle 21 pivot and tilt a nozzle 21C or 21D into a posture perpendicular to the surface W1B. The nozzle 21C or 21D in the tilted state is moved in the X direction. The seal agent 100 is thus applied to the surface W1B. After completion of application to the surface W1B, application to the surface W1C that is a planar portion is performed again. At this time, the tilting nozzle 21C or 21D is returned, and the nozzle 21 is set upright in a posture perpendicular to the surface W1C. A nozzle 21E or 21F in the upright state is moved in the Y direction, thereby applying the seal agent 100 to the surface W1C.

The above-described posture control of the nozzle 21 is performed in real time in accordance with the tilt of the application surface of the seal agent 100 without stopping the movement of the nozzle 21.

At this time, when the discharge amount of the seal agent 100 by the operation unit 2 is controlled in accordance with the moving speed of the nozzle 21 by the moving device 3, the seal agent 100 can be applied more evenly. For example, in a portion where the nozzle 21 is moved at a low speed, the discharge amount of the seal agent 100 is decreased. In a portion where the nozzle 21 is moved at a high speed, the discharge amount of the seal agent 100 is increased. When making the operation unit 2 pivot about the axis XA, the discharge amount of the seal agent 100 is controlled in accordance with the peripheral speed of the nozzle 21, thereby applying the seal agent 100 more evenly before and after the posture change of the operation unit 2.

More specifically, during the process of performing movement control of the moving device 3 and the posture changing unit 34 by the control apparatus 9A, the moving speed of the distal end portion 21a of the nozzle 21 is calculated. The calculation of the distal end moving speed of the nozzle 21 is performed based on first moving speed information of the portion 21c of the nozzle 21 moved by the movable unit 31, the elevating unit 33, and the posture changing unit 34 and second moving speed information of the distal end portion 21a that moves about the portion 21c as the center. The calculated distal end moving speed information is transmitted to the control apparatus 9B via the interface unit 93A. The control apparatus 9B receives the distal end moving speed information via the interface unit 93B, and controls the discharge amount of the seal agent 100 based on the received distal end moving speed information. As for the discharge amount of the seal agent 100, the discharge amount is set in advance in correspondence with a predetermined distal end speed. Note that the distance between the seal application position Wp and the distal end portion 21a of the nozzle 21 is set and controlled to an optimum height depending on the viscosity, material, and the like of the seal agent 100.

Figure 10:
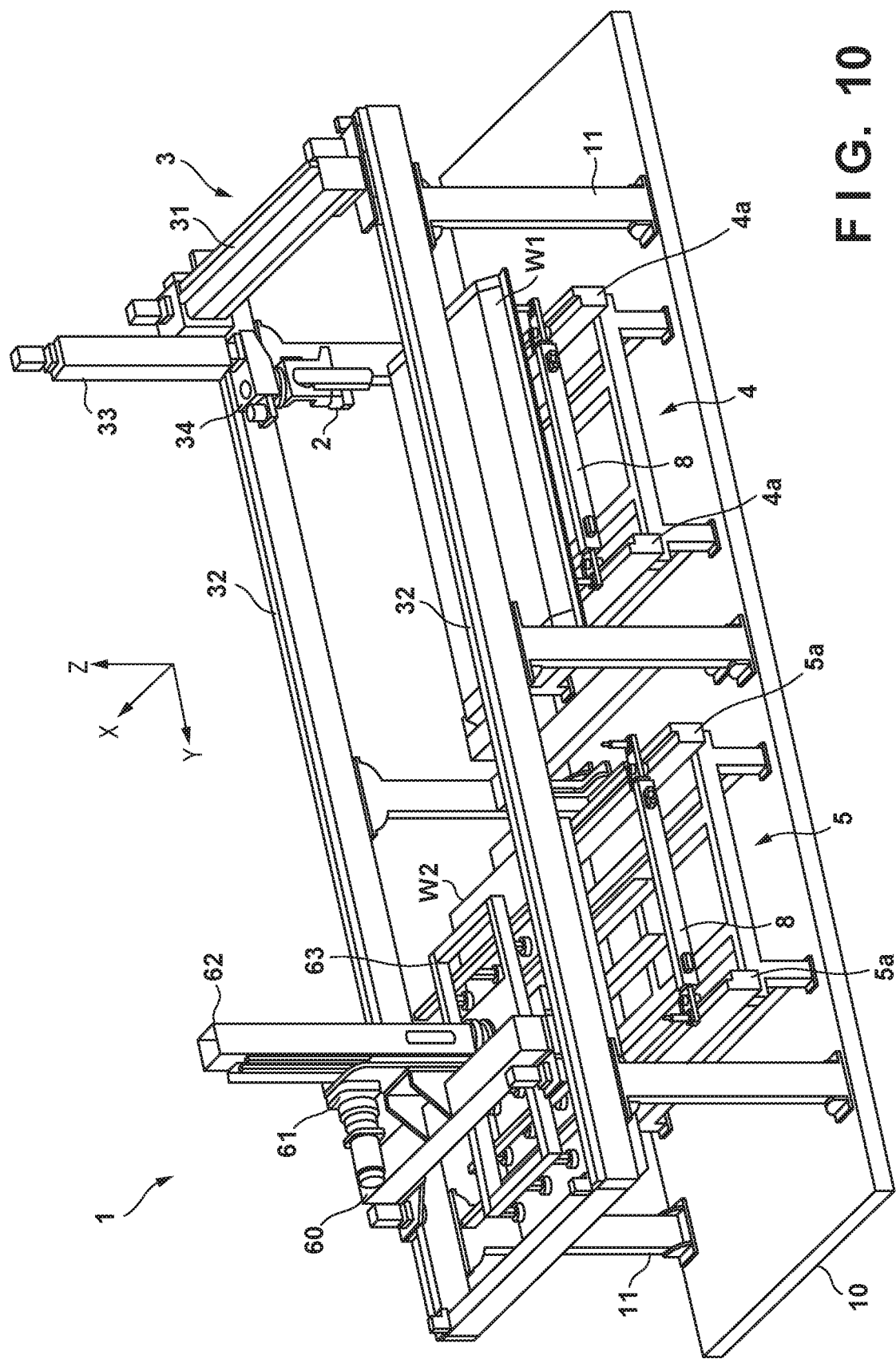
FIG. 10 is an operation explanatory view of the operation system shown in FIG. 1.

When the application of the seal agent 100 to the work W1 is completed, the process advances to a process of overlaying the work W2 on the work W1. The moving device 3 moves to a standby position set in advance and stands by. FIG. 10 shows a process of holding the work W2 on the support device 5 by the holding unit 63. The holding unit 63 is temporarily lowered by the elevating unit 61 and holds the work W2. At the time of holding, the work W2 is positioned with respect to the holding unit 63 by the plurality of positioning portions 633 and 634 and held in an appropriate posture. When the holding unit 63 holds the work W2, the holding unit 63 is raised by the elevating unit 61 to move the work W2 upward from the support device 5.

Figure 11:
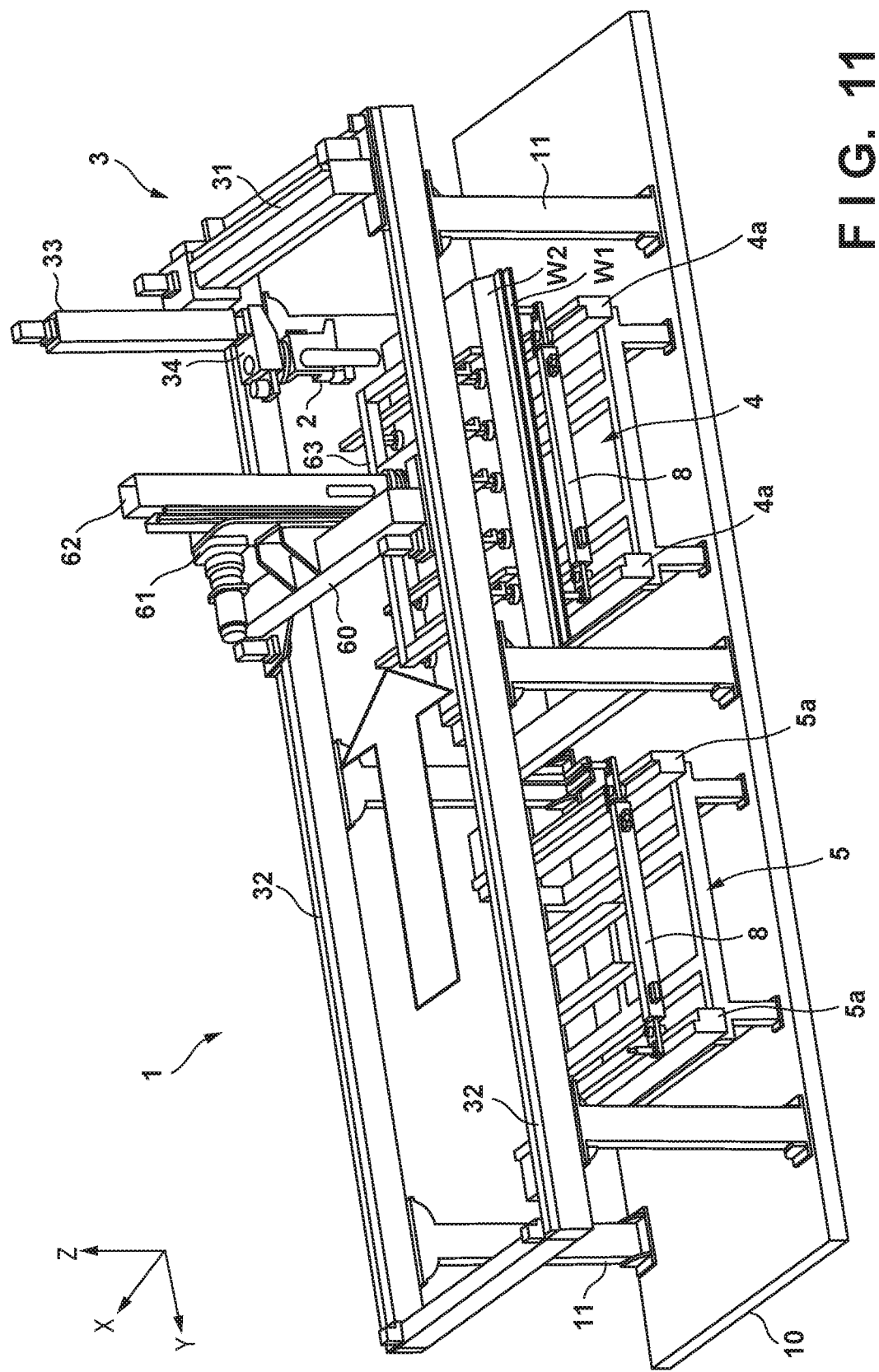
FIG. 11 is an operation explanatory view of the operation system shown in FIG. 1.

Next, the movable unit 60 is moved in the Y direction, as shown in FIG. 11 to convey the work W2 to a position on the upper side of the work W1. The holding unit 63 is lowered by the elevating unit 61 to overlay the work W2 on the work W1. The work W2 is thus bonded to the work W1 via the seal agent 100. After that, the conveyance device 6 returns to the initial position (the position in FIG. 8). The works W1 and W2 bonded to each other are transferred by the transfer mechanisms 4a to the conveyance mechanism (not shown) outside the system. Similar processes are repeated from then on.

In this embodiment, the application operation of the seal agent 100 to the work W1, and the like can be performed in the above-described way. Since the moving device 3 that moves the operation unit 2 is configured to operate on the upper side of the work W1, the occupation area of the operation system 1 substantially need only be slightly larger than the size of the work W1. It is therefore possible to make the occupation area of the system smaller than in a layout in which a vertical articulated robot is arranged on a lateral side of a work. Particularly in a production system formed by arranging a plurality of operation systems configured to perform a plurality of operations, the occupation area of the entire production system can be made small, and the factory can effectively be used. In addition, the movement of the operation unit 2 is translation in the X, Y, and Z directions, and in the initial posture, the axis ZA of the posture change of the operation unit 2 is coaxial to the nozzle 21, and the axis XA crosses the axis ZA on the nozzle 21. It is therefore possible to facilitate position control of the nozzle distal end portion with respect to the discharge position and application control according to the speed of the nozzle distal end portion as compared to a case of the combination of pivotal movements of a plurality of operation shafts as in the vertical articulated robot.

Other Embodiments

In the above-described embodiment, the operation system concerning the operation of continuous application of the seal agent has been exemplified. However, the present invention is also applicable to an operation other than the application operation of the seal agent. That is, the present invention is applicable to an operation system including an operation unit including an operation portion that performs an operation for an operation point of a work or a posture changing unit that supports the operation unit. The operation portion is a solid or hollow shaft body. Examples are a nozzle (for example, a laser gun) that emits a laser beam to perform laser cutting or laser machining, a drill or a cutting tool used for chamfering or cutting, and a nozzle having a function of supplying a welding material to perform welding (for example, MIG welding or MAG welding).

The present invention is not limited to the above embodiments, and various changes and modifications can be made within the spirit and scope of the present invention. Therefore, to apprise the public of the scope of the present invention, the following claims are made.

The invention claimed is:

1. An application system comprising:
an application unit including a nozzle configured to discharge a seal agent to a work; and
a moving device configured to move the application unit, wherein
the moving device includes:
a movable unit provided to be movable in a first horizontal direction along a guide portion extended in the first horizontal direction and including a support portion extending in a second horizontal direction orthogonal to the first horizontal direction;
an elevating unit provided to be movable in the second horizontal direction with respect to the support portion; and
a posture changing unit configured to be raised and lowered by the elevating unit and support the application unit,
the application unit includes a supply portion configured to supply the seal agent to the nozzle,
the nozzle includes a proximal end portion to which the seal agent is supplied from the supply portion, and a distal end portion configured to discharge the seal agent,
the posture changing unit includes:
a first pivot mechanism configured to make the application unit pivot about a vertical axis; and
a second pivot mechanism configured to make the application unit pivot about a horizontal axis,
when the application unit is in a posture in which an axial direction of the nozzle faces a vertical direction, the vertical axis and the nozzle are located on the same axis, and the vertical axis and the horizontal axis cross on a center axis of the nozzle,
the application system further comprises:
a pair of frames serving as the guide portion, which are extended in the first horizontal direction and apart in the second horizontal direction;
a plurality of support columns configured to support the pair of frames;
a support device configured to support the work; and
a base member configured to support the plurality of support columns and the support device,
the movable unit is laid on the pair of frames,
the support device is arranged under a moving range of the movable unit, and includes a positioning portion configured to position the work, and the base member includes an installation portion where the plurality of support columns are installed, and an installation portion where the support device is installed.

2. The application system according to claim 1, wherein the posture changing unit further includes a support member configured to support the application unit, and the support member includes:
a first fixed portion to which the supply portion is fixed; and
a connecting portion connected to the second pivot mechanism.

3. The application system according to claim 2, further comprising a measuring unit configured to measure an application state of the seal agent discharged from the nozzle,
wherein the support member further includes a second fixed portion to which the measuring unit is fixed.

4. The application system according to claim 1, wherein
a portion on the center axis at which the vertical axis and the horizontal axis cross is a portion apart from the distal end portion to a side of the proximal end portion.

5. The application system according to claim 1, further comprising a control apparatus configured to control the moving device,
wherein the control apparatus controls a position of the nozzle while changing a discharge direction of the nozzle along an application path of the seal agent to the work.

6. The application system according to claim 1, further comprising a control apparatus configured to control the application unit,
wherein the control apparatus controls a discharge amount of the seal agent by the application unit in accordance with a moving speed of the nozzle by the moving device.

7. The application system according to claim 1, wherein
the posture changing unit comprises a support member extended in the vertical direction,
the application unit is supported at a lower end of the support member to be able to pivot about the horizontal axis, and
the second pivot mechanism includes:
a motor supported by the support member on an upper side of the lower end; and
a transmission mechanism supported by the support member and configured to transmit a driving force of the motor to the application unit and make the application unit pivot about the horizontal axis.

8. The application system according to claim 7, wherein
the transmission mechanism includes:
a driven gear connected to a pivot shaft of the application unit;
a driving gear arranged on an upper side of the driven gear and driven by the driving force of the motor; and
a rack configured to transmit rotation of the driving gear to the driven gear.

9. The application system according to claim 1, wherein
the support device further includes a transfer mechanism configured to transfer the work between an outside and an inside of the application system.

10. The application system according to claim 1, further comprising a conveyance device configured to convey, on to a work supported by the support device, an attachment body to be attached to the work via the seal agent,
wherein the conveyance device includes:
a second movable unit laid on the pair of frames and configured to move in the first horizontal direction;
a second elevating unit supported by the second movable unit;
a holding unit configured to hold the attachment body and raised and lowered by the second elevating unit.

11. The application system according to claim 10, wherein
the holding unit includes a holding portion configured to hold the attachment body, and a positioning portion configured to position the held attachment body in the horizontal direction and the vertical direction.

12. The application system according to claim 10, wherein
the support device further includes a transfer mechanism configured to transfer the attachment body between an outside and an inside of the application system.

13. The application system according to claim 10, wherein the conveyance device includes a third pivot mechanism supported by the second elevating unit and configured to make the holding unit pivot about the vertical axis.

14. An operation system comprising:
an operation unit including an operation portion configured to perform an operation for an operation point of a work; and
a moving device configured to move the operation unit, wherein
the moving device includes:
a movable unit provided to be movable in a first horizontal direction along a guide portion extended in the first horizontal direction and including a support portion extending in a second horizontal direction orthogonal to the first horizontal direction;
an elevating unit provided to be movable in the second horizontal direction with respect to the support portion; and
a posture changing unit configured to be raised and lowered by the elevating unit and support the operation unit,
the operation portion is a solid or hollow shaft body,
the posture changing unit includes:
a first pivot mechanism configured to make the operation unit pivot about a vertical axis; and
a second pivot mechanism configured to make the operation unit pivot about a horizontal axis,
when the operation unit is in a posture in which an operation shaft of the operation portion faces a vertical direction, the vertical axis and the operation portion are located on the same axis, and the vertical axis and the horizontal axis cross on a center axis of the operation portion,
the operation system further comprises:
a pair of frames serving as the guide portion, which are extended in the first horizontal direction and apart in the second horizontal direction;
a plurality of support columns configured to support the pair of frames;
a support device configured to support the work; and
a base member configured to support the plurality of support columns and the support device,
the movable unit is laid on the pair of frames,
the support device is arranged under a moving range of the movable unit, and includes a positioning portion configured to position the work, and the base member includes an installation portion where the plurality of support columns are installed, and an installation portion where the support device is installed.

* * * * *